United States Patent [19]

Warych

[11] Patent Number: 4,894,192

[45] Date of Patent: Jan. 16, 1990

[54] PROCESS FOR PRODUCING MOLDED BODIES FROM PAPER AND A THERMOPLASTIC MATERIAL

[76] Inventor: Hans Warych, Birkenkamp 23, 4650 Gelsenkirchen, Fed. Rep. of Germany

[21] Appl. No.: 227,206

[22] Filed: Aug. 2, 1988

[30] Foreign Application Priority Data

Aug. 5, 1987 [DE] Fed. Rep. of Germany ....... 3725965

[51] Int. Cl.$^4$ ...................... B29C 35/02; B29C 47/00; B29C 47/78
[52] U.S. Cl. ..................................... 264/68; 264/140; 264/211; 264/DIG. 69
[58] Field of Search .................. 264/37, 68, 148, 171, 264/211, 349, DIG. 69, 140

[56] References Cited

U.S. PATENT DOCUMENTS 3,956,541  5/1976  Pringle ......................... 264/DIG. 69
4,708,623  11/1987  Aoki et al. ....................... 264/349 X

FOREIGN PATENT DOCUMENTS 2152718  4/1972  Fed. Rep. of Germany ........ 264/37
3501139  7/1986  Fed. Rep. of Germany ........ 264/37
219725  3/1985  German Democratic Rep. ... 264/37
253215  1/1988  German Democratic Rep. ............ 264/DIG. 69
47-16581  9/1972  Japan ........................... 264/DIG. 69
1369204  10/1974  United Kingdom ....... 264/DIG. 69

Primary Examiner—Jeffery Thurlow
Assistant Examiner—Leo B. Tentoni
Attorney, Agent, or Firm—Schwartz & Weinrieb

[57] ABSTRACT

A method of producing mouldings from paper and a thermoplastics. Paper and thermoplastics waste are reduced to shavings or chips. The same are introduced into a screw extruder to melt the thermoplastics and prepared therein to be extrudable. The mixture of melted thermoplastics and paper shavings is shaped continuously into the moulding by means of an extruding tool disposed after the screw extruder. The method is used more particularly with waste of plastics-coated packing paper as feed material.

14 Claims, No Drawings

PROCESS FOR PRODUCING MOLDED BODIES FROM PAPER AND A THERMOPLASTIC MATERIAL

DESCRIPTION

The invention concerns a process for producing molded bodies from paper and a thermoplastic material.

Numerous articles of the daily life consist of paper, others of thermoplastic material. Other articles yet consist of paper coated with thermoplastic material. This is true especially for articles of the packaging industry. Scrap accures in the manufacture of these articles and after their use, which scrap is an environmental and landfill burden, especially as far as the plastic component is concerned. It is known though to recycle trimming scrap accruing in the manufacture of plastic foil, introducing it in a plastic screw type press, a so-called extruder, in order to produce from it again plastic foils. But such a recycling has so far not been carried out were paper coated with a thermoplastic material was concerned. Besides, there is no simple process available which allows making from paper and thermoplastic material, preferably from respective scrap, articles of their own which meet high requirements in terms of strength, stability and corrosive performance.

The problem underlying the invention is to produce from paper and thermoplastic material articles of their own which can be used, for instance in the construction industry, packaging industry but also for other purposes.

For solving this problem, the object of the invention is a process for making molded bodies from paper and a thermoplastic material, which process is characterized in that waste paper and thermoplastic material are shredded, in that the shreds are introduced in a screw extruder for melting the thermoplastic material and making it extrudable, and in that the mixture from the molten plastic and paper shreds is molded continuously to a molded body, with the aid of an extrusion tool connected to the screw extruder, which molded body can then be trimmed into sections of certain length. This teaching for technical procedure encompasses a balancing rule, and at that, that the mixing ratio of paper/plastic should be so selected that an extrudable processing is possible in an extruder. The share of thermoplastic material must not be too low but, on the other hand, may practically be as high as desired. The shreds should have an edge length of several mm, for instance 2 mm.

A preferred embodiment of the invention is characterized in that scrap, specifically trimming scrap of a packaging paper which is plastic-coated on at least one side, is used as base material, Insofar, the invention is utilizing the fact that in the case of scrap of this type the conditions are such, for reasons of coating, that an extrudable processing is readily possible in an extruder. This is surprising because the plastic coating is mostly very thin. What's more, the paper components and the plastic components have already been intimately joined by the coating process. All of this applies specifically when working with scrap where the quotient from the basis weight of the paper, for one, and the basis weight of the plastic, for another, range between 1.0 and 6.5, for instance at 2. In this context, scrap is preferably used where the basis weight of the paper is about 200 g/m$^2$ and that of the plastic about 60 g/m$^2$. Especially good molded bodies, in qualitative respects, are obtained when the plastic-coating or the plastic consists of polyethylene. It is within the scope of the invention to admix additional paper shreds to the shreds. It is also within the scope of the invention to additionally admix to the shreds finely divided thermoplastic materials, for instance plastic foil shreds. It goes without saying that also other fillers may be admixed to the shreds. All types of usual screw extruders may be used within the scope of the invention, while dual screw extruders are given preference.

When proceeding according to the teaching of the invention, molded bodies aree obtained which excel especially in mechanical respects. The paper ingredient forms in the molded bodies a reinforcement and a skeleton in a plastic matrix, imparting to the molded bodies a special bending resistance and compression strength but also particular durability. Moreover, the plastic component makes the molded bodies resistant to weather and in most environments also extremely corrosion-resistant. Therefore, the manufactured molded bodies may be used for many applicatins in the construction industry and the packaging industry, for instance in the form of wall panels or finish panels for wall panels, floor panels and ceiling panels or finish panels for floor and ceiling panels, profiles and also for the production of shipping pallets.

I claim:

1. A process for producing a molded body from paper and a thermoplastic material, comprising the steps of:
    collecting scrap material, comprising paper coated with a thermoplastic material uponn at least one side thereof, wherein the quotient ratio defined between the base weight of said paper with respect to the base weight of said thermoplastic material coated thereon is within the range of 1.0–6.5;
    shredding said scrap material comprising said paper and said thermoplastic material coated thereon into shreds;
    introducing said shreds into a screw extruder so as to melt said thermoplastic material and form an extrudable mixture; and
    forming said mixture of molten thermoplastic material and paper shreds into a molded body.

2. Process according to claim 1, wherein scrap is used where the basis weight of the paper is about 200 g/m$^2$ and that of the plastic about 60 g/m$^2$.

3. Process according to claim 1, wherein the plastic coating consists of polyethylene.

4. Process according to claim 2, wherein the plastic coating consists of polyethylene.

5. Process according to claim 1, wherein paper clippings are additionally admixed to the shreds.

6. Process according to claim 2, wherein paper clippings are additionally admixed to the shreds.

7. The process as set forth in claim 1, wherein: said quotient ratio is 2.

8. The process as set forth in claim 7, wherein: said thermoplastic material comprises polyethylene.

9. The process as set forth in claim 1, wherein: said scrap material comprises trimmed scrap from packing paper.

10. The process as set forth in claim 3, wherein: said scrap material comprises trimmed scrap from packing paper.

11. The process as set forth in claim 7, wherein: said scrap material comprises trimmed scrap from packing paper.

12. The process as set forth in claim 3, wherein:

said scrap material comprises trimmed scrap from packing paper.

13. The process as set forth in claim 4, wherein: said scrap material comprises trimmed scrap from packing paper.

14. The process as set forth in claim 8, wherein: said scrap material comprises trimmed scrap from packing paper.

* * * * *